United States Patent
Scheuring, III et al.

(10) Patent No.: US 7,318,596 B2
(45) Date of Patent: Jan. 15, 2008

(54) RETRACTABLE RUNNING BOARD

(75) Inventors: Joseph F. Scheuring, III, Newmarket (CA); Terry L. Reid, Alliston (CA)

(73) Assignee: Ventra Group Inc., Bradford, Ontario (CA)

( * ) Notice: Subject to any disclaimer, the term of this patent is extended or adjusted under 35 U.S.C. 154(b) by 317 days.

(21) Appl. No.: 11/118,769

(22) Filed: May 2, 2005

(65) Prior Publication Data

US 2005/0258616 A1    Nov. 24, 2005

Related U.S. Application Data

(60) Provisional application No. 60/566,913, filed on May 3, 2004.

(51) Int. Cl.
*B60R 3/02* (2006.01)
(52) U.S. Cl. ................................ 280/166; 280/163
(58) Field of Classification Search ............... 280/163, 280/166
See application file for complete search history.

(56) References Cited

U.S. PATENT DOCUMENTS

| | | | |
|---|---|---|---|
| 1,113,355 A | 10/1914 | Kent | |
| 1,660,307 A | 2/1928 | Bronson | |
| 1,660,308 A | 2/1928 | Bronson | |
| 1,784,781 A | 12/1930 | Bronson | |
| 1,784,782 A | 12/1930 | Bronson | |
| 1,860,654 A | 5/1932 | Cavanagh | |
| 1,862,131 A | 6/1932 | Woolson | |
| 1,907,689 A | 5/1933 | Vrooman | |
| 1,928,682 A | 10/1933 | Bronson | |
| 1,934,256 A | 11/1933 | Bronson | |
| 1,947,824 A | 2/1934 | Bronson | |
| 2,084,014 A | 6/1937 | Bronson | |
| 2,084,019 A | 6/1937 | Edwards | |
| 2,088,739 A | 8/1937 | Geyer | |
| 3,608,957 A | 9/1971 | Maneck | |
| 3,756,164 A | 9/1973 | Miller et al. | |
| 3,762,742 A | 10/1973 | Bucklen | |
| 4,020,920 A | 5/1977 | Abbott | |
| 4,021,055 A | 5/1977 | Okland | |
| 4,116,457 A | 9/1978 | Nerem et al. | |
| 4,167,272 A | 9/1979 | Wright et al. | |
| 4,203,611 A | 5/1980 | Makela | |
| 4,257,620 A | 3/1981 | Okland | |
| 4,266,792 A | 5/1981 | Sanders et al. | |

(Continued)

FOREIGN PATENT DOCUMENTS

DE      43 41 134 A1      6/1995

(Continued)

*Primary Examiner*—Jeff Restifo
(74) *Attorney, Agent, or Firm*—Pillsbury Winthrop Shaw Pittman LLP

(57) ABSTRACT

A retractable running board assembly is mounted to the frame of a vehicle. The running board is selectively extendable between a retracted position, which is close to the vehicle's frame, a lower, laterally-outward extended position that facilitates easy entrance into and exit from the vehicle and a roof-access position, higher and outward from the entrance position. A selectively-operable driving mechanism actuates a link to extend and retract the running board. When the driving mechanism is not operated, each link resists actuation and holds the running board in a fixed position relative to the frame.

31 Claims, 14 Drawing Sheets

U.S. PATENT DOCUMENTS

| | | | |
|---|---|---|---|
| 4,451,063 A | 5/1984 | Snyder | |
| 4,456,275 A | 6/1984 | Snyder et al. | |
| 4,679,810 A | 7/1987 | Kimball | |
| 4,696,507 A | 9/1987 | Alldredge | |
| 4,838,567 A | 6/1989 | Michanczyk | |
| 4,934,721 A | 6/1990 | Flores | |
| 5,193,829 A | 3/1993 | Holloway et al. | |
| 5,286,049 A | 2/1994 | Khan | |
| 5,382,035 A | 1/1995 | Waddington et al. | |
| 5,511,750 A | 4/1996 | Evenson | |
| 5,538,269 A | 7/1996 | McDaniel et al. | |
| 5,697,626 A | 12/1997 | McDaniel et al. | |
| 5,713,589 A | 2/1998 | Delgado et al. | |
| 5,738,180 A | 4/1998 | Hofmann et al. | |
| D395,268 S | 6/1998 | Tucker | |
| 5,769,439 A | 6/1998 | Thompson | |
| 5,806,869 A | 9/1998 | Richards | |
| 5,823,553 A | 10/1998 | Thompson | |
| 5,842,709 A | 12/1998 | Maccabee | |
| 5,884,534 A | 3/1999 | Knoll et al. | |
| 5,895,064 A | 4/1999 | Laubach | |
| 5,944,332 A | 8/1999 | Lee et al. | |
| 5,961,138 A | 10/1999 | Roark et al. | |
| D424,006 S | 5/2000 | Lemieux et al. | |
| 6,135,472 A | 10/2000 | Wilson et al. | |
| 6,141,997 A | 11/2000 | Blehi | |
| 6,168,176 B1 | 1/2001 | Mueller | |
| 6,170,842 B1 | 1/2001 | Mueller | |
| 6,173,979 B1 | 1/2001 | Bernard | |
| 6,203,040 B1 | 3/2001 | Hutchins | |
| 6,267,398 B1 | 7/2001 | Lombard | |
| 6,375,207 B1 | 4/2002 | Dean et al. | |
| 6,409,193 B2 | 6/2002 | Bernard | |
| 6,581,946 B2 | 6/2003 | Lund et al. | |
| 6,588,782 B2 | 7/2003 | Coomber et al. | |
| 6,622,592 B2 | 9/2003 | Lee | |
| 6,641,158 B2 | 11/2003 | Leitner | |
| 6,746,033 B1 * | 6/2004 | McDaniel | 280/166 |
| 6,830,257 B2 * | 12/2004 | Leitner | 280/166 |
| 6,834,875 B2 * | 12/2004 | Leitner et al. | 280/166 |
| 6,926,295 B2 * | 8/2005 | Berkebile et al. | 280/166 |
| 6,942,233 B2 * | 9/2005 | Leitner et al. | 280/166 |
| 6,955,370 B2 * | 10/2005 | Fabiano et al. | 280/163 |
| 7,017,927 B2 * | 3/2006 | Henderson et al. | 280/166 |
| 7,055,839 B2 * | 6/2006 | Leitner | 280/166 |
| 7,070,194 B2 * | 7/2006 | Garland et al. | 280/166 |
| 7,118,120 B2 * | 10/2006 | Lee et al. | 280/166 |
| 7,163,221 B2 * | 1/2007 | Leitner | 280/166 |
| 2005/0035568 A1 * | 2/2005 | Lee et al. | 280/166 |
| 2005/0104318 A1 * | 5/2005 | Lee et al. | 280/166 |
| 2006/0125204 A1 * | 6/2006 | Leitner et al. | 280/166 |

FOREIGN PATENT DOCUMENTS

| | | |
|---|---|---|
| EP | 1 329 360 A1 | 7/2003 |
| WO | WO 00/50262 | 8/2000 |
| WO | WO 02/053416 A2 | 7/2002 |
| WO | WO 02/085670 A2 | 10/2002 |

* cited by examiner

RETRACTABLE RUNNING BOARD

CROSS-REFERENCE

This application is related to U.S. Provisional Patent Application No. 60/348,389 titled "Retractable Running Board," filed on Jan. 16, 2002, and to U.S. patent application Ser. No. 10/341,432 titled "Retractable Running Board," filed on Jan. 14, 2003, both of which are incorporated herein by reference. Priority is claimed from U.S. Provisional Patent Application No. 60/566,913, filed May 3, 2004, which is incorporated herein by reference.

BACKGROUND OF THE INVENTION

1. Field of the Invention

The present invention relates to retractable running boards for vehicles.

2. Description of Related Art

Most conventional vehicle running boards have fixed positions relative to the frames of the vehicles to which that they are attached.

Designers of fixed-position running board vehicles must balance ground clearance against the desire to place running boards in a lower, more passenger convenient position midway between ground level and the lower edge of the vehicle door opening. In a vehicle such as a truck, in which a large ground clearance is advantageous, the cab and passenger seats are typically disposed well above ground level. Consequently, conventional running boards provide an intermediate step for passengers to use to enter and exit the vehicle. From the standpoint of facilitating a passenger's entrance and exit from the vehicle, the most convenient height for a running board is generally at about half the distance between the ground level and the lower edge of the vehicle door opening. However, disposing the running board at such a low position reduces the vehicle's ground clearance. Consequently, designers must sacrifice either convenience or ground clearance when determining the height of a fixed-position running board.

In response, certain retractable running boards, such as the running board disclosed in U.S. Pat. No. 5,697,626, include running boards with selectively variable heights. When the vehicle is being driven, the running board is raised vertically to improve the vehicle's ground clearance. Conversely, when the vehicle is stopped, the running board can be lowered to position the running board at a more convenient height for the passengers.

Vehicle designers face an additional dilemma when determining the lateral position of fixed-position running boards. To provide the most convenience to passengers entering or exiting a vehicle, the running board should be disposed laterally outwardly from the vehicle's entrances/doors such that the lower edge of the door opening, the running board, and the ground, form laterally- and vertically-spaced steps like those in building stairways. Unfortunately, disposing a running board fixed laterally outwardly from the vehicle for the passengers' convenience can tend to increase the vehicle's width.

Certain retractable running boards, such as the running board disclosed in U.S. Pat. No. 3,608,957, have been designed to extend laterally outwardly when the vehicle's door is opened such that the running board is in a convenient laterally-outward position when the passengers need to use it to enter and exit the vehicle. Conversely, the running board is retracted laterally inwardly when the door is closed so that the vehicle has a narrower width during operation.

SUMMARY OF THE INVENTION

One aspect of the present invention provides a retractable running board assembly for use with a vehicle having a passenger compartment and an opening for permitting a person to enter and exit the passenger compartment. The retractable running board assembly includes an anchor constructed and arranged to mount the running board assembly to the vehicle in an operative position beneath the passenger compartment, a longitudinally-elongated retractable running board and a running board moving assembly including a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation lower than the opening of the passenger compartment and spaced above ground level, (b) a roof-access position wherein the running board is positioned outward and upward relative to the step-assist position, and (c) a retracted position wherein the running board is retracted inwardly and raised upwardly from the extended position, and a selectively-operable driving mechanism operatively connected to the selectively-actuated link such that, when the running board assembly is mounted in the operative position, selective operation of the driving mechanism actuates the selectively-actuated links to move the running board between the step-assist, roof-access and retracted positions.

Another aspect of the present invention includes a vehicle including a passenger compartment, an opening for permitting a person to enter and exit the passenger compartment and a retractable running board assembly. The retractable running board assembly includes an anchor constructed and arranged to mount the running board assembly to the vehicle in an operative position beneath the passenger compartment, a longitudinally-elongated retractable running board and a running board moving assembly including a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation lower than the opening of the passenger compartment and spaced above ground level, (b) a roof-access position wherein the running board is positioned outward and upward relative to the step-assist position, and (c) a retracted position wherein the running board is retracted inwardly and raised upwardly from the extended position, and a selectively-operable driving mechanism operatively connected to the selectively-actuated link such that, when the running board assembly is mounted in the operative position, selective operation of the driving mechanism actuates the selectively-actuated links to move the running board between the step-assist, roof-access and retracted positions.

Another aspect of the present invention includes a method of operating a running board assembly on a vehicle having a passenger compartment and an opening for permitting a person to enter and exit the passenger compartment. The retractable running board assembly includes an anchor constructed and arranged to mount the running board assembly to the vehicle in an operative position beneath the passenger compartment, a longitudinally-elongated retractable running board and a running board moving assembly including a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation lower than the opening of the passenger compartment and spaced above ground level, (b) a roof-access position wherein the running board is positioned outward and upward relative to the step-assist position, and (c) a retracted position wherein the running board is retracted inwardly and raised upwardly from the extended position, and a selectively-operable driving mechanism operatively connected to the selectively-actuated link such that, when the running board assembly is mounted in the operative position, selective operation of the driving mechanism actuates the selectively-actuated links to move the running board between the step-assist, roof-access and retracted positions. The method includes selectively operating the driving mechanism to actuate the selectively-actuated link, thereby moving the running board vertically and horizontally between the retracted position, the roof-access position and the step-assist positions.

Additional and/or alternative aspects, objects, features, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS OF THE INVENTION

Figure 1:
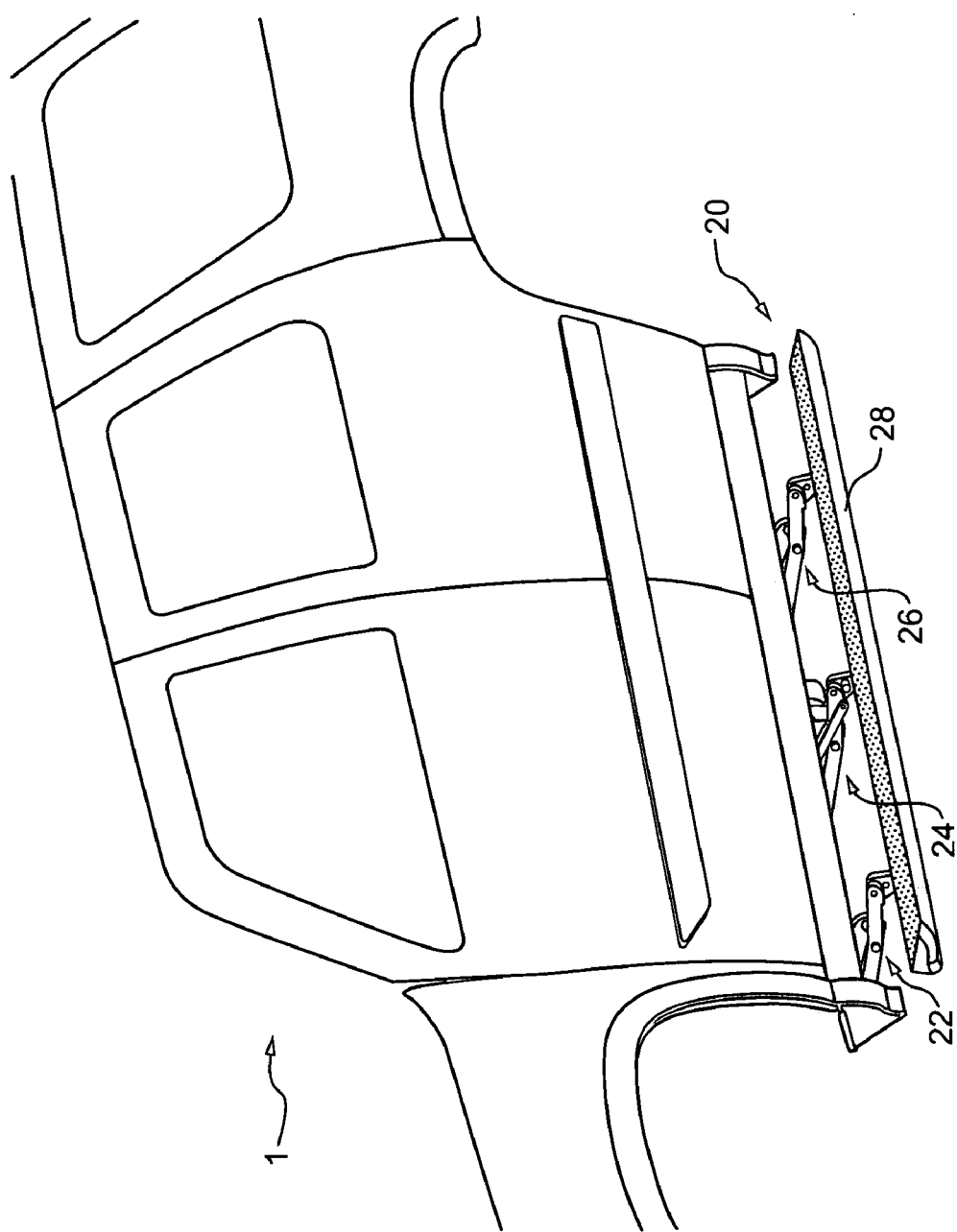
FIG. 1 is a partial perspective view of a vehicle with a retractable running board in a step-assist position according to an embodiment of the present invention.

As illustrated in FIG. 1, a vehicle 1 includes side doors 10 and a retractable running board assembly, indicated generally at 20. The retractable running board assembly 20 includes three supports 22, 24, 26, each respectively mounted to a frame (not shown) of the vehicle 1. The supports 22, 24, 26 together support a running board 28, that is illustrated in FIG. 1 as being in a step-assist position. That is, in the position shown in FIG. 1, a vehicle operator would generally make use of the running board 28 to climb into the vehicle 1 from a position standing on the ground (not shown). Though this embodiment makes use of three supports 22, 24, 26 for the running board 28, that is not a strict requirement. Fewer or more than three supports could be employed without straying from the principles of the invention. In general, the use of at least two supports provides for improved torque resistance. Furthermore three supports allows for retracting and extending force to be applied at a central portion of the running board 28 such that the translational forces do not apply a substantial rotational force to the running board 28.

Figure 2:
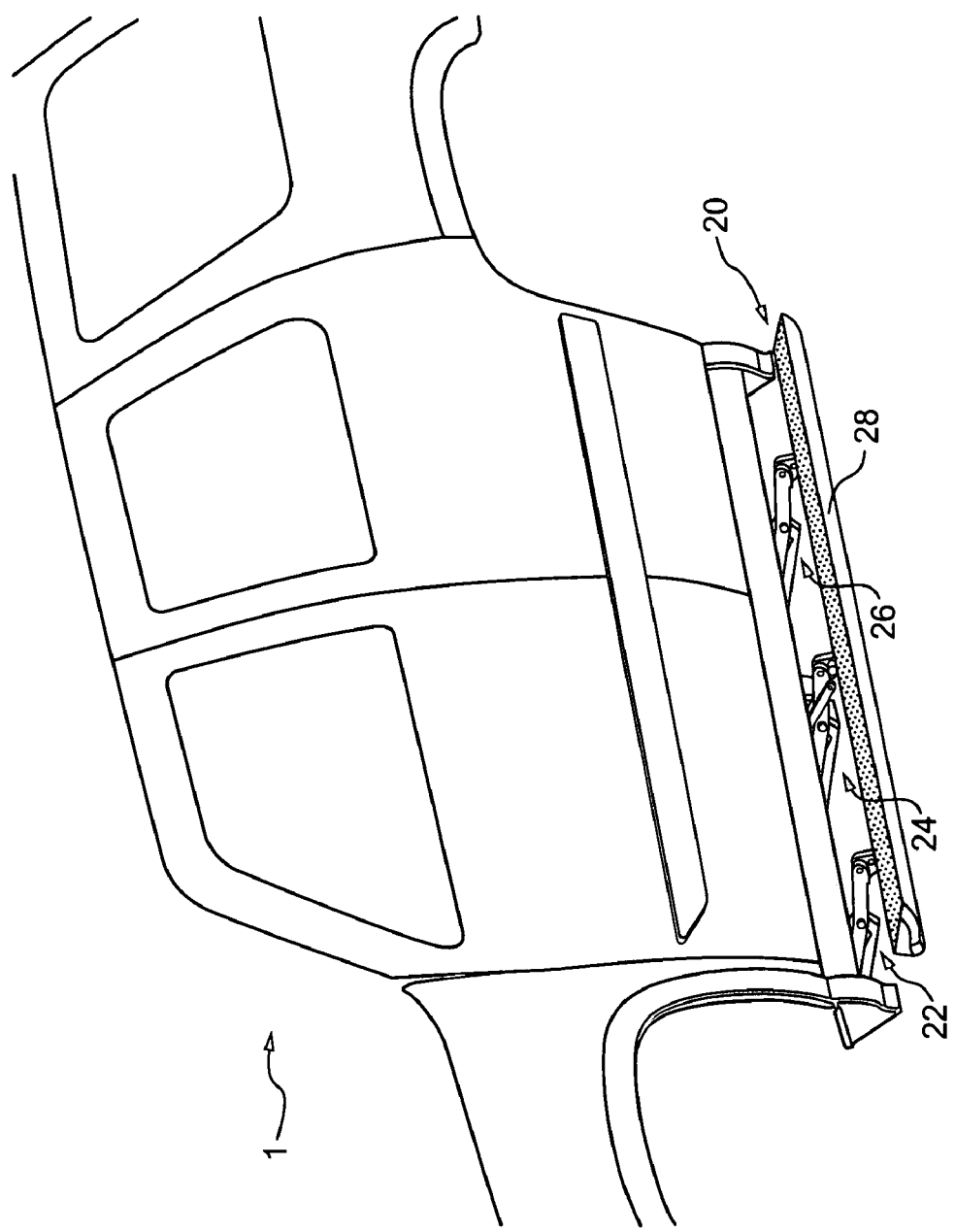
FIG. 2 is a partial perspective view of a vehicle with a retractable running board in a roof-access position according to an embodiment of the present invention.

In FIG. 2, the running board assembly 20 has been moved from the step-assist position of FIG. 1 to a roof-access position. In the roof-access position, the running board 28 is raised and laterally extended relative to the step-assist position of FIG. 1. Thus, a person attempting to reach, for example, a roof luggage rack on top of the vehicle is more easily able to do so.

Figure 3:
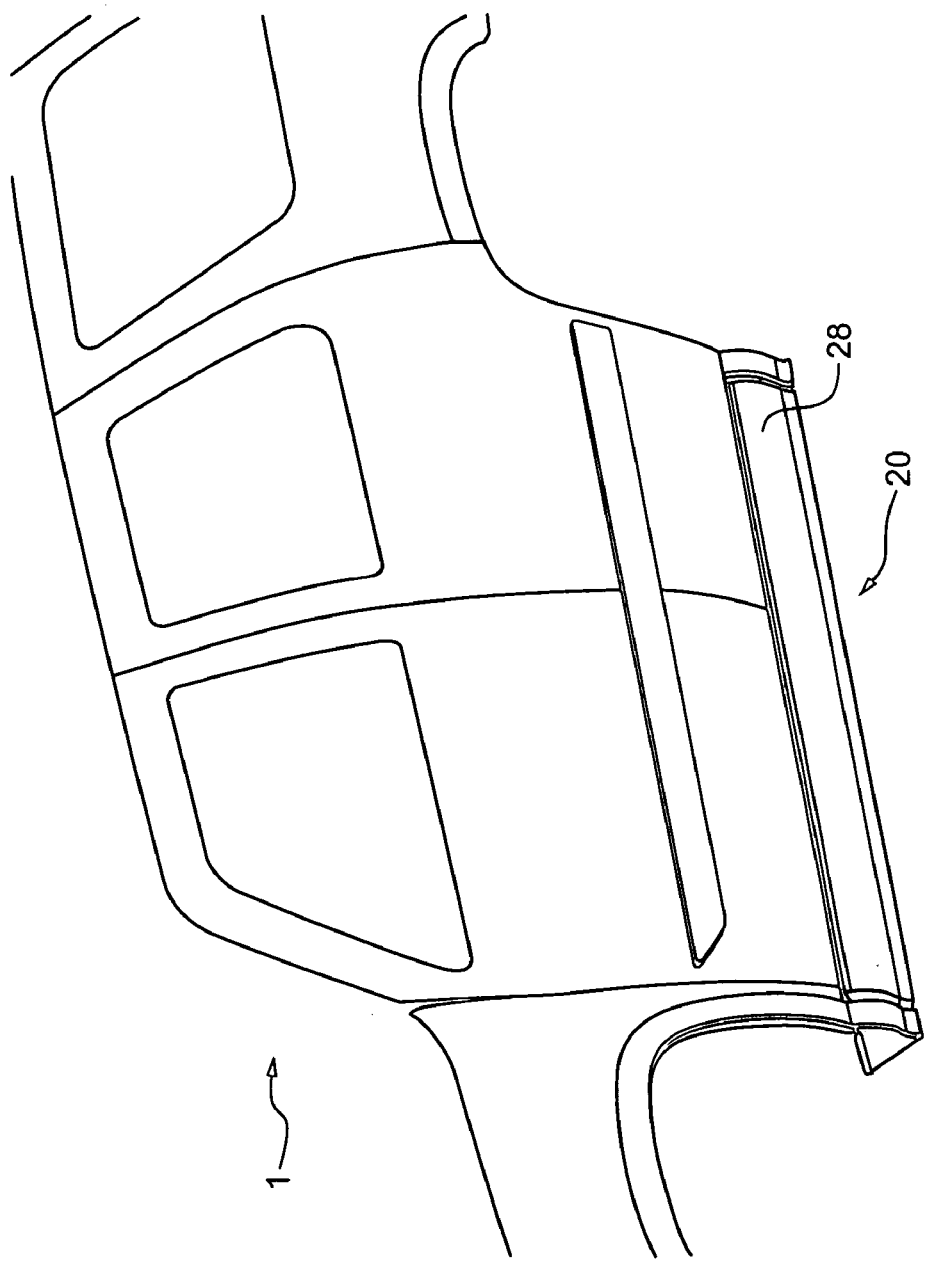
FIG. 3 is a partial perspective view of a vehicle with a retractable running board in a retracted position according to an embodiment of the present invention.

FIG. 3 illustrates the running board assembly 20 in a retracted position. In the retracted position, the running board 28 is held essentially flush with the panels of the vehicle 1. By shaping the running board in a manner similar to the vehicle body panels, the running board 28 in the retracted position can be made to appear as though it is simply an exterior panel of the vehicle 1.

Figure 4:
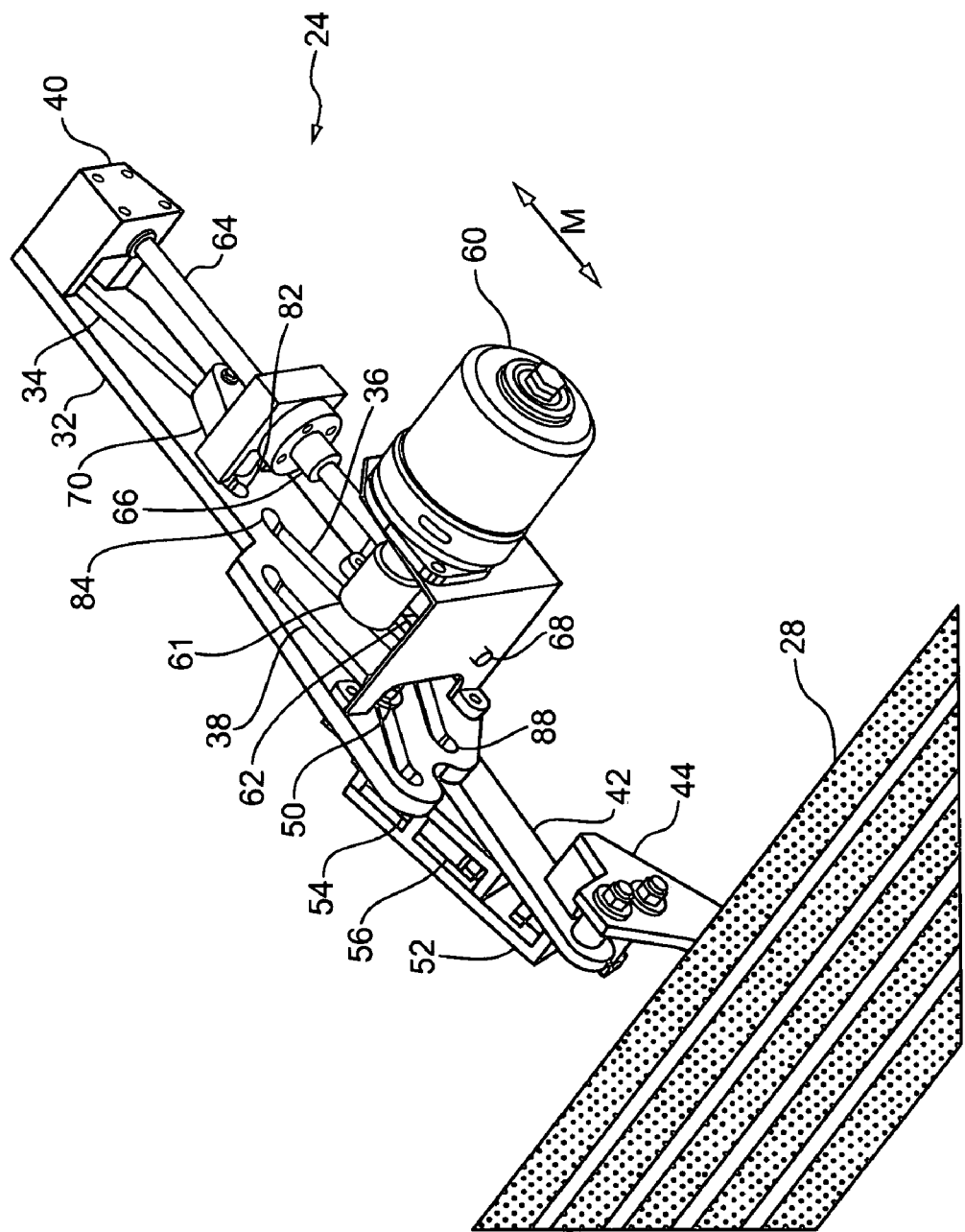
FIG. 4 is a partial perspective view of a driven support linkage for a retractable running board in a step-assist position according to an embodiment of the present invention.

FIG. 4 is a more detailed view of one of the supports 24 in accordance with an embodiment of the present invention. In FIG. 4, the running board is illustrated in the step-assist extended position, as in FIG. 1. The support 24 has a main rail 32 that forms the primary structure of the support 24. The main rail, in turn, includes three horizontally oriented slots, 34, 36 and 38. It is fastened at one end, via an end support 40, to the underside of the vehicle (not shown). At the other end, the main rail 32 is connected to a support link 42, which in turn engages a support arm 44. The support arm 44 is connected to and supports the running board 28.

The three slots 34, 36 and 38 provide for the translational and rotational motion of the running board 28. Specifically, in this embodiment, slot 34 acts as an inner travel, allowing an inner support pin 46 (best seen in FIG. 7) to slide therein as the board is actuated. Slot 36 acts as an outer step travel, through which outer support pin 48 (best seen in FIG. 7)

travels during motion of the running board 28. Slot 38 is a step rotating slot through which the step rotating pin 50 travels.

A first, inner portion of the step rotating slot 38 has a length different from the corresponding inner portion of the outer step travel, thereby causing a relative rotational motion of the step rotating pin 50 and the outer support pin 48. This relative rotational motion is transferred to the support arm 44 by a biasing link 52. The biasing link 52 includes bi-directional biasing springs 54, 56, the action of which will be described later.

In an alternate embodiment, the support arm 44 does not provide a rotational motion. In this embodiment, the step rotating slot 38 and step rotating pin 50 are not needed, and the retracted position of the running board 28 retains the essentially horizontal orientation of the two extended positions.

A motor 60 is provided to produce the actuating force for motion of the support 24. The motor 60 is rotatable, and its rotational motion is translated into linear motion along the direction M by way of a worm 61, including a worm gear 62 that acts in conjunction with a lead screw 64. The lead screw 64, when turned by the worm gear 62, rotates relative to a lead screw nut 66. The inner end of the lead screw 64 is supported by the end support 40 and an outer end of the lead screw 64 is supported by an outer end support 68, and the two end supports allow the lead screw 64 to rotate freely therein. The lead screw nut 66, therefore, moves along the direction M as the lead screw 64 is turned.

The lead screw nut 66 is connected to the inner support pin 46 by way of a pivoting drive link 70. Thus, as the lead screw nut 66 moves along the direction M, the pivoting drive link 70 exerts a force on the inner support pin 46, driving it through the inner travel slot 34. The pivoting action of the drive link 70 allows the inner support pin 46 the freedom to travel through the inner travel slot 34, even though the slot 34 is not linear, while the motion of the lead screw nut 66 is linear.

As can be seen from FIG. 4, each of the three slots, 34, 36, 38 has an inner position, a central position and an outer position. The step-assist position of the running board 28 as shown in FIG. 4 corresponds to an arrangement in which each of the pins 46, 48 and 50 is in the central position of its corresponding slot.

Figure 5:
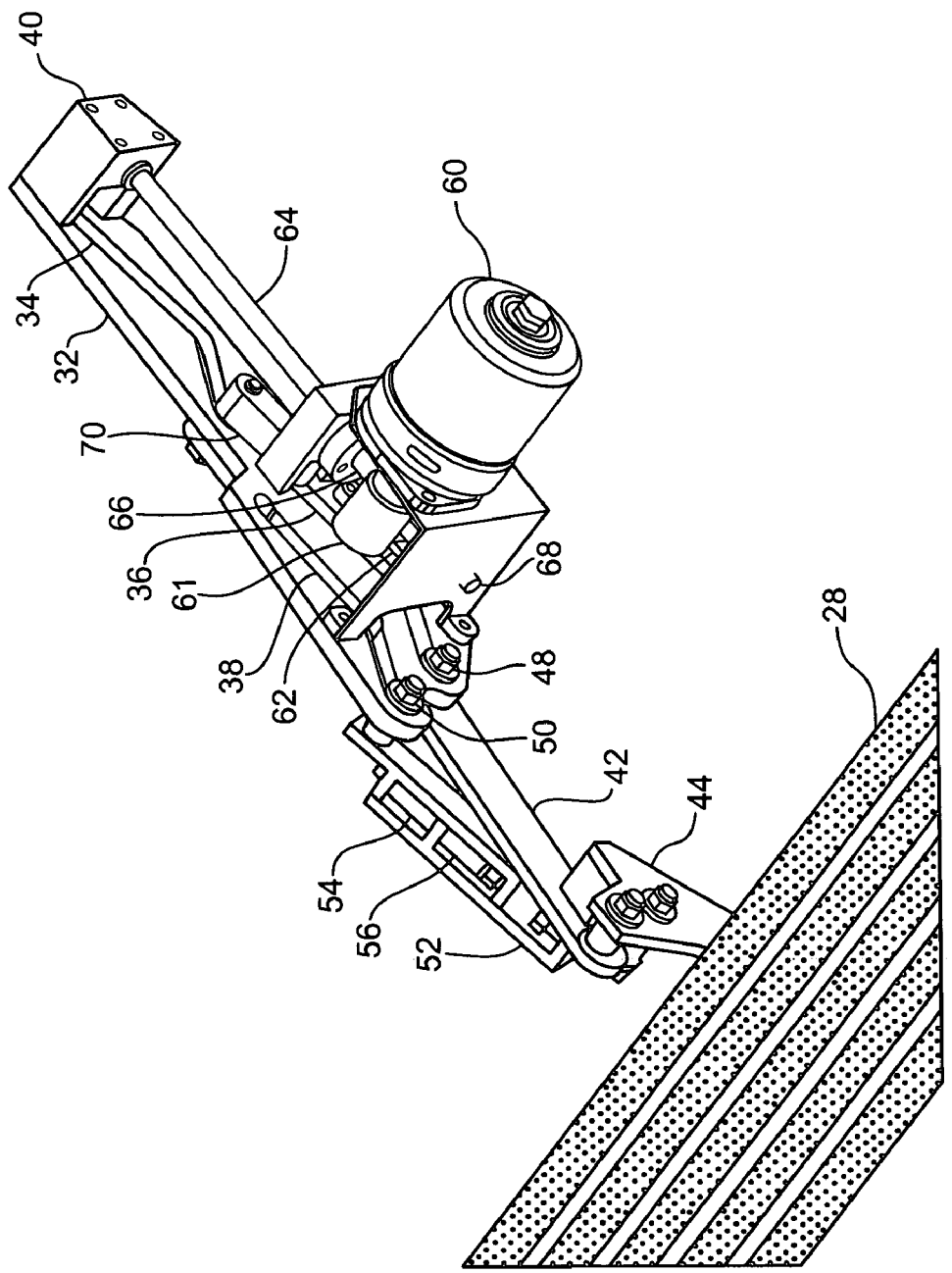
FIG. 5 is a partial perspective view of a driven support linkage for a retractable running board in a roof-access position according to an embodiment of the present invention.

FIG. 5 illustrates the roof-access position of the running board 28, with all components numbered as in FIG. 4. In the roof-access position, the lead screw nut 66 has been driven outward to drive the inner support pin 46 to the outer position of the inner travel slot 34. Likewise, pins 48 and 50 have traveled freely to respective outer positions of their respective slots 36 and 38.

Because the outer portion of the step rotating slot has a length and path equal to the corresponding outer portion of the outer step travel, no relative rotational motion of the step rotating pin 50 and the outer support pin 48 is induced. Thus, no relative rotational motion is transferred to the support arm 44 by the biasing link 52 during the shift from the step-assist position to the roof-access position. This results in a maintenance of the attitude of the running board 28, allowing it to remain parallel to the ground.

Figure 6:
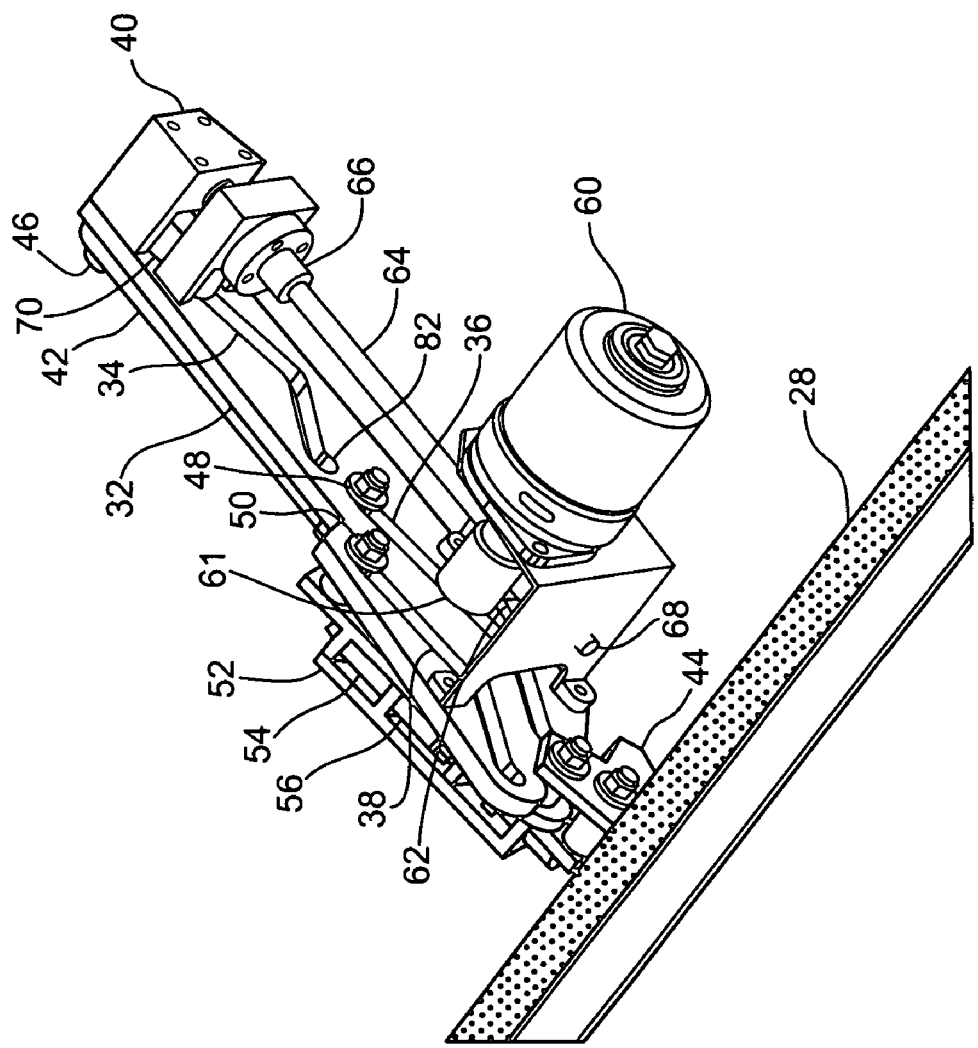
FIG. 6 is a partial perspective view of a driven support linkage for a retractable running board in a retracted position according to an embodiment of the present invention.

FIG. 6 illustrates the retracted position of the running board 28, with all components numbered as in FIGS. 4 and 5. In the retracted position, the lead screw nut 66 has been driven inward to drive the inner support pin 46 to the inner position of the inner travel slot 34. Likewise, pins 48 and 50 have traveled freely to respective inner positions of their respective slots 36 and 38.

Because the inner portion of the step rotating slot 38 has a length and path that differ from the corresponding inner portion of the outer step travel, relative rotational motion of the step rotating pin 50 and the outer support pin 48 is induced. This causes a rotational motion of the biasing link 52, which in turn causes rotational motion of the support arm 44. This results in an inward rotation of the running board 28, causing it to rotate from its parallel to the ground attitude to a position essentially flush with side panels of the vehicle 1.

The biasing link 52 is constructed and arranged to provide bi-directional biasing forces. When the running board 28 is in the retracted position, spring 54 exerts a tensile force. The biasing link 52 therefore pulls inward on the support arm 44, thereby tending to rotate the running board 28 to pull it towards the body of the vehicle 1. When the running board 28 is in the step-assist or roof-access position, spring 56 is in compression and therefore exerts an outward force on the support link 42 and the support arm 44. As a result, the running board 28 is pushed towards a position in which a step surface of the board 28 is roughly parallel to the ground.

It should be noted that the biasing link can be replaced with a standard link. In such an arrangement, the running board 28 could be sufficiently urged towards its parallel to the ground attitude by gravity and/or by the action of the motor 60. Likewise, the retracted position could be reached simply by use of the motor and the board could be held in place against the vehicle body by use of detents and/or the motor.

Figure 7:
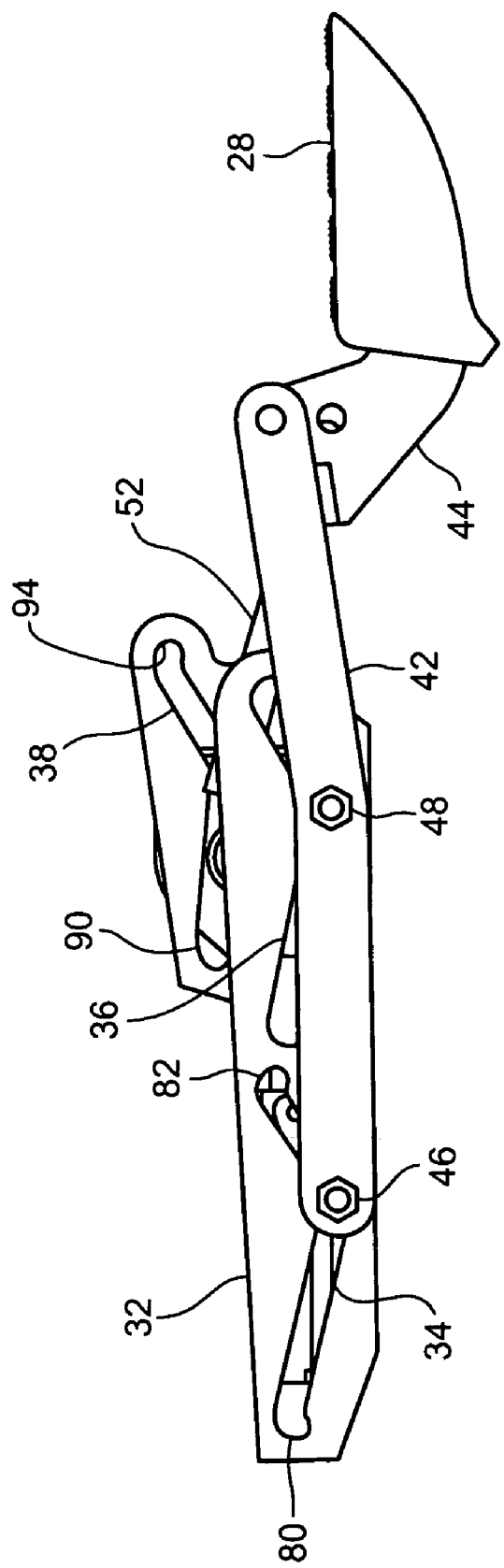
FIG. 7 is a side view of the driven support linkage for a retractable running board in a step assist position according to an embodiment of the present invention.
Figure 8:
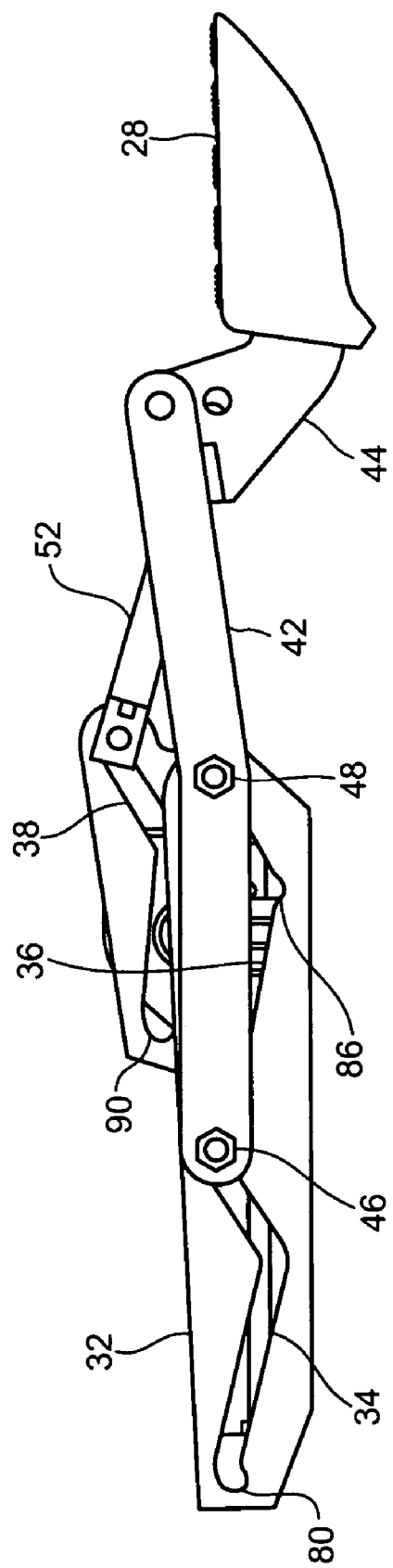
FIG. 8 is a side view of the driven support linkage for a retractable running board in a roof-access position according to an embodiment of the present invention.
Figure 9:
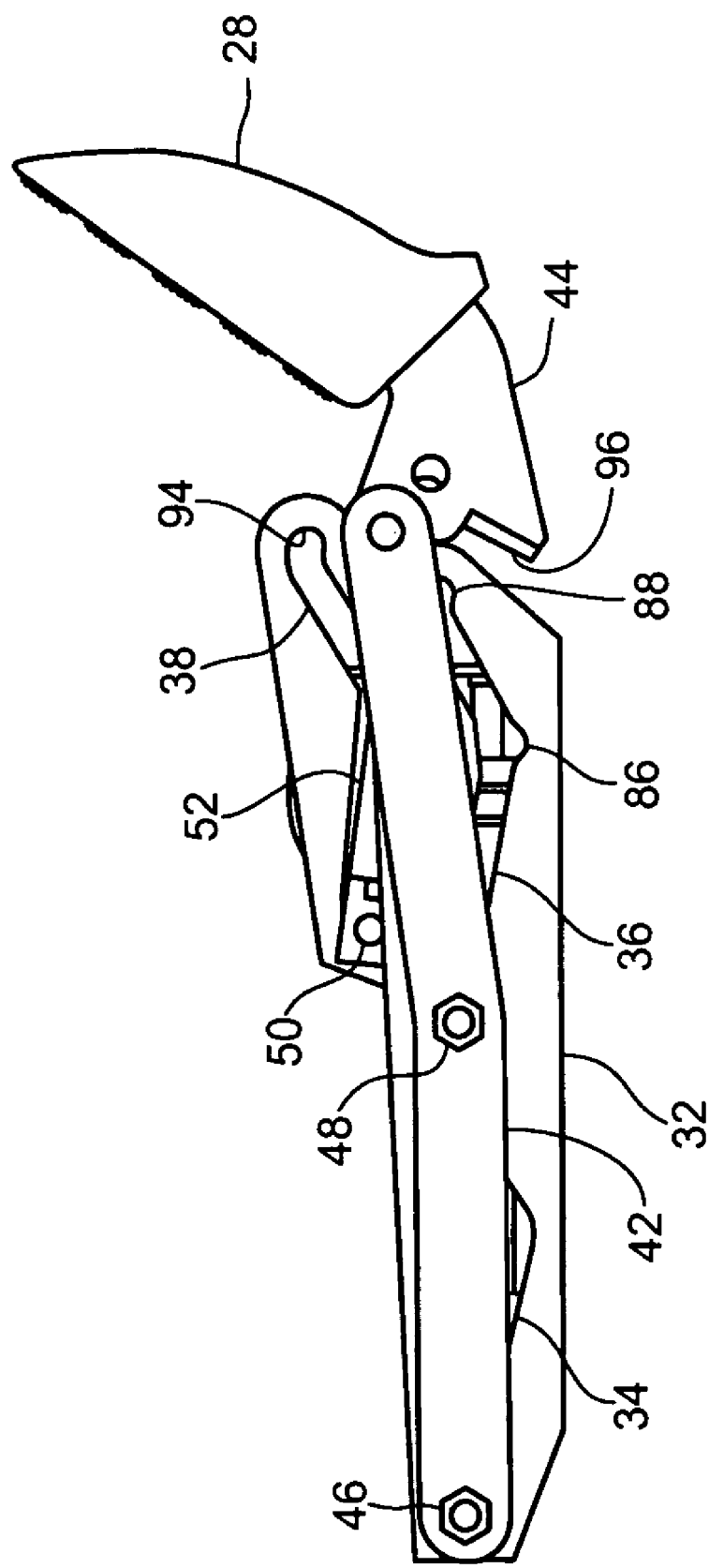
FIG. 9 is a side view of the driven support linkage for a retractable running board in a retracted position according to an embodiment of the present invention.

FIGS. 7-9 are side views of the driven support linkage assembly. As may be seen in the FIGS. , the slots 34, 36, 38 include a series of detents. Slot 34 includes detents 80 and 82 at its inner and outer ends respectively. Likewise, slot 36 includes detents 84, 86, 88 and slot 38 includes detents 90, 92, 94. The detents 80, 84 and 90 act to stabilize the running board 28 in its retracted position, while detents 82, 88 and 94 act to stabilize the running board 28 in its roof-access position. Finally detents 86 and 92 stabilize the running board 28 in its step-assist position.

The detents are not required for the operation of the invention, and the slots may instead allow substantially free travel. However, use of the detents can reduce loads on the biasing springs 54, 56 and the motor 70, by providing a structure against which loads on the running board 28 may be applied. Note that in the illustrated embodiments, the inner travel slot 34 lacks a detent corresponding to the step-assist position. A detent at this position can cause binding of the motion of the support link 42 during retraction, therefore, it may be beneficial to omit this detent.

Also illustrated in FIG. 9 is a portion 96 of the support arm 44 that acts as a hard stop to the rotation of the support arm 44. That is, when the running board 28 is in either of the horizontal attitudes, the hard stop 96 engages a cooperating member of another component, for example, the support link 42. This allows the weight of the step, and any load on the step, to be borne by the mechanical components, rather than loading the motor 60.

Figure 10:
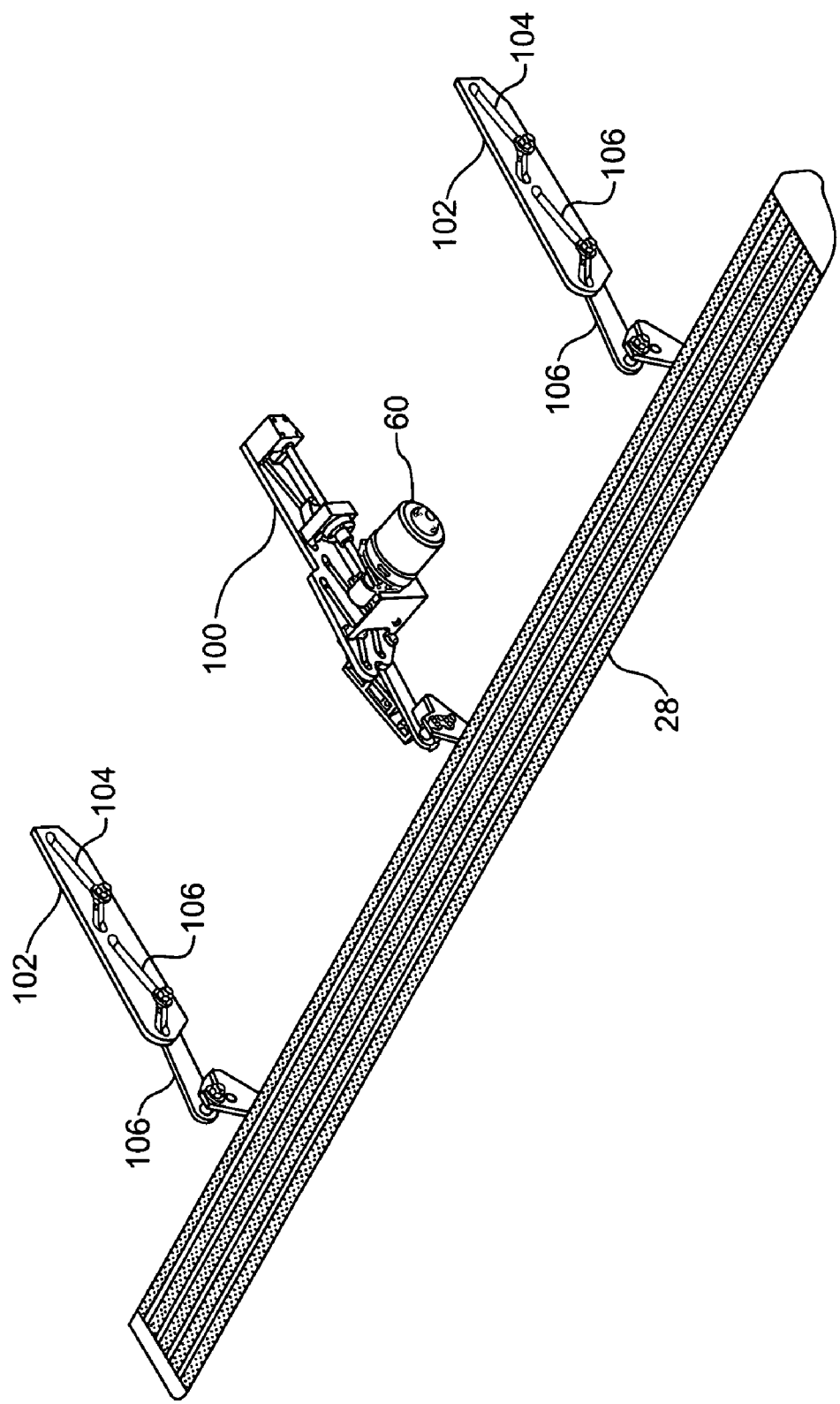
FIG. 10 is a partial perspective view of a retractable running board in a step-assist position according to an embodiment of the present invention.
Figure 11:
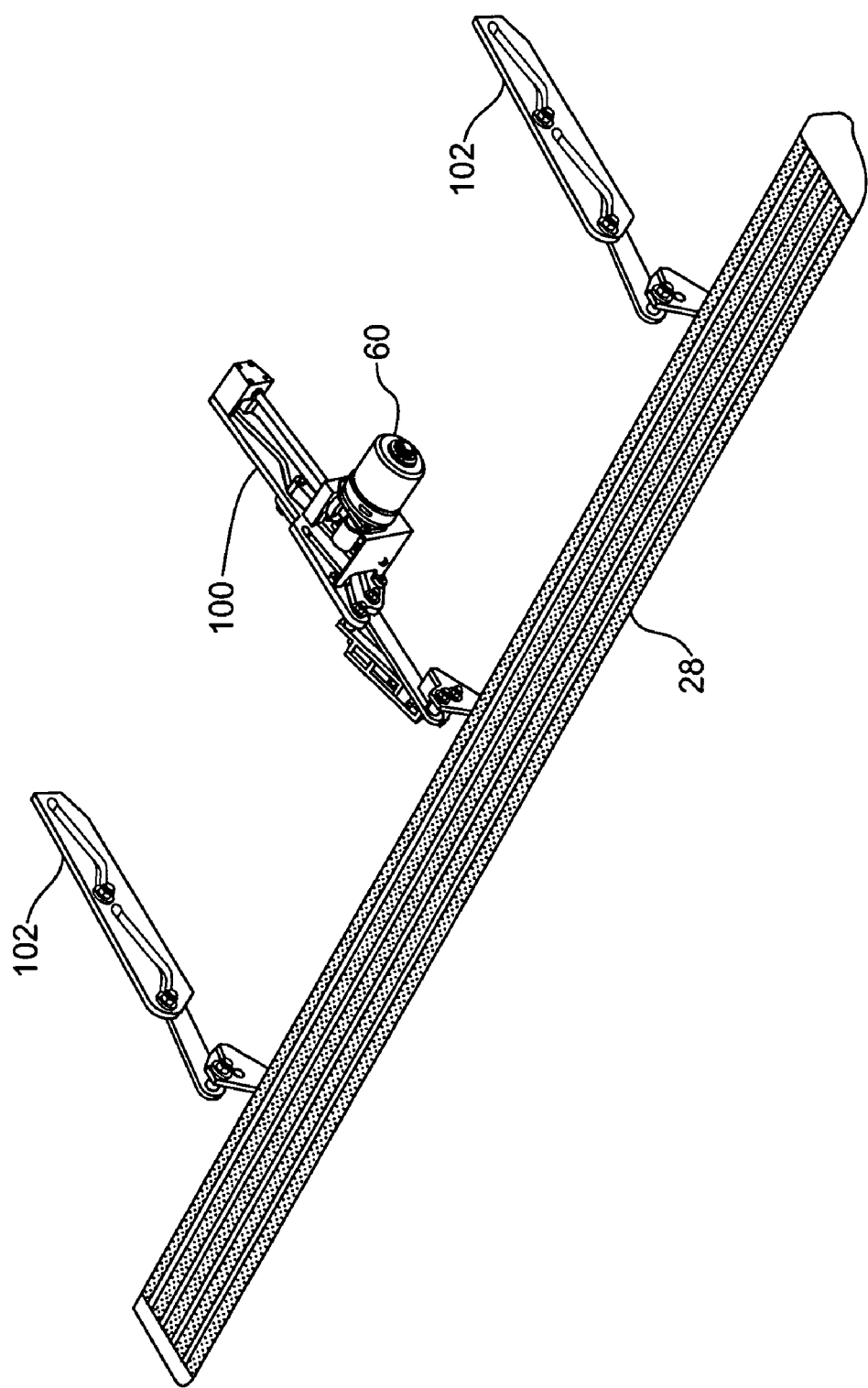
FIG. 11 is a partial perspective view of a retractable running board in a roof-access position according to an embodiment of the present invention; and, FIG. 12 is a partial perspective view of a retractable running board in a retracted position according to an embodiment of the present invention.
Figure 12:
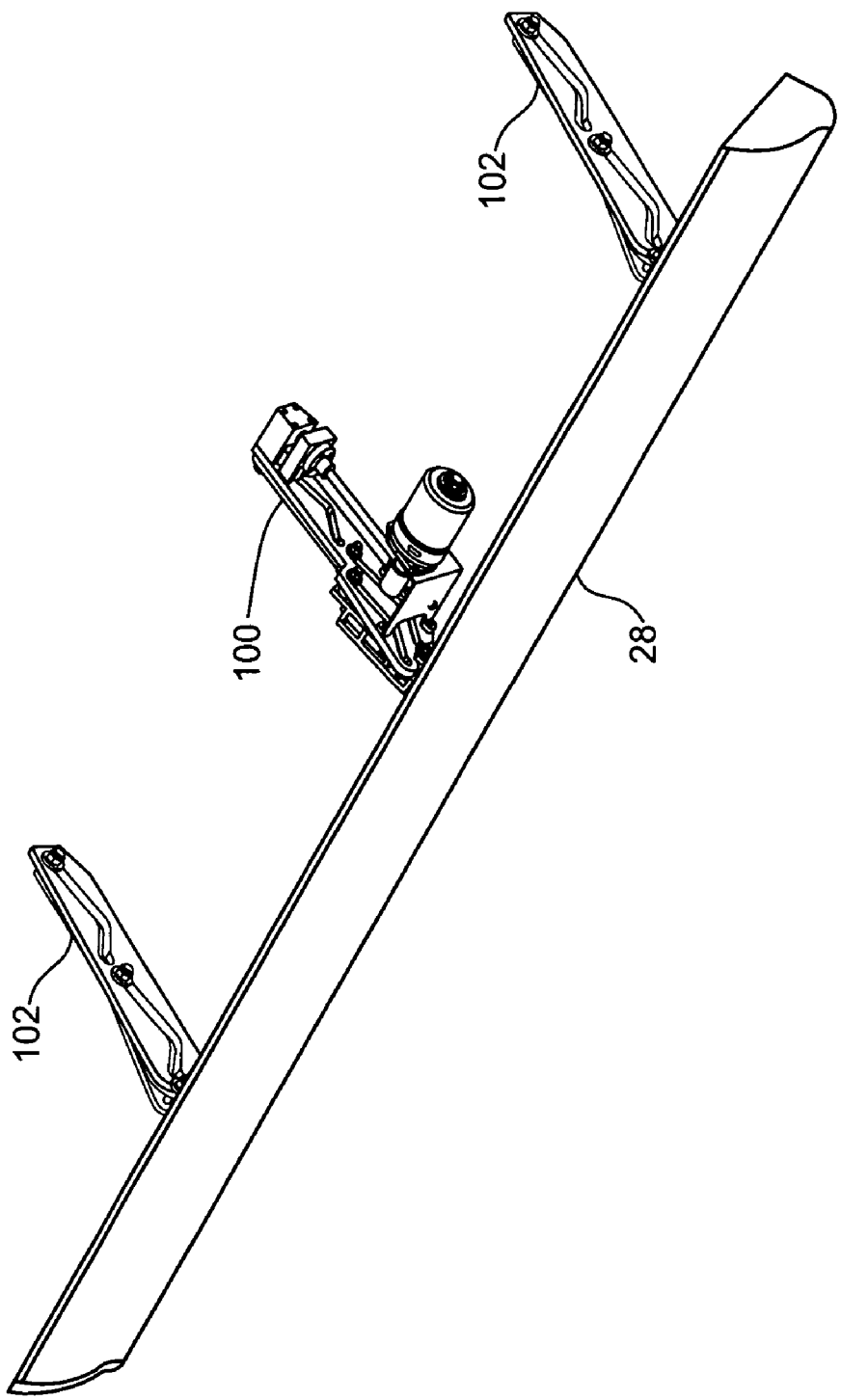

FIGS. 10-12 illustrate the running board assembly 20 in the step-assist, roof-access and retracted positions respectively. Each running board assembly 20 includes a running board 28, a driven support linkage assembly 100 and two secondary support linkage assemblies 102. The driven support linkage assembly 100 corresponds to the assembly illustrated in FIGS. 4-9 and includes a motor 60. Though three supports 100, 102 are illustrated, this number is not strictly required as described above. The two secondary support linkage assemblies 102 include a pair of slots, allowing travel of the links 106 to correspond with the travel of the driven support linkage 100. The freely traveling support links 106 act essentially to support weight and to take up moments applied to the running board 28 when it is not loaded precisely at its midpoint.

It should be noted that alternately, the driven support linkage assembly 100 can be driven by a manual drive. Likewise, one or both of the support linkage assemblies 102 can be replaced by a driven linkage assembly 100, to distribute the drive power along the length of the running board 28, though this would come at the expense of a larger overall package.

Figure 13A:
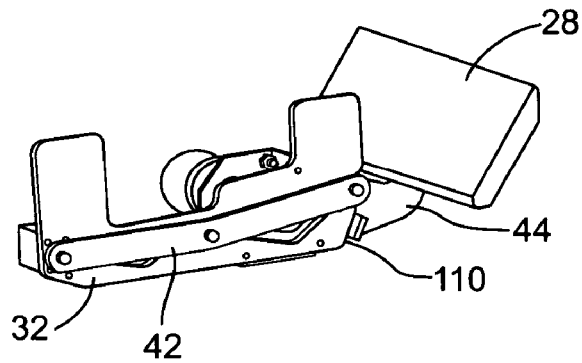
FIGS. 13a-13f are perspective views illustrating deployment of a retractable running board in accordance with an embodiment of the invention.
Figure 13B:
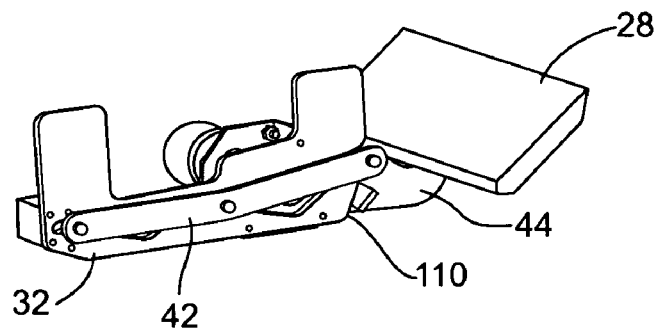
Figure 13C:
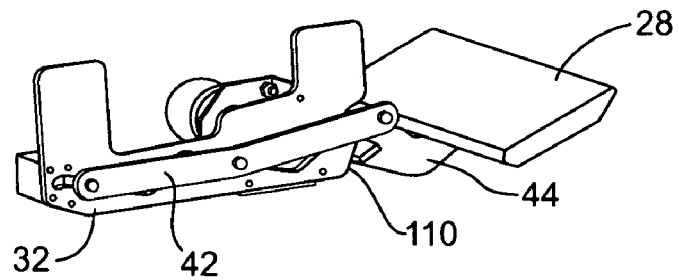
Figure 13D:
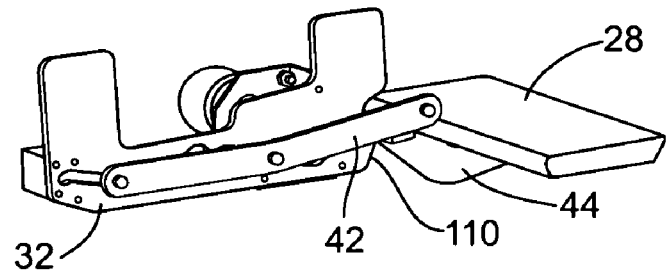
Figure 13E:
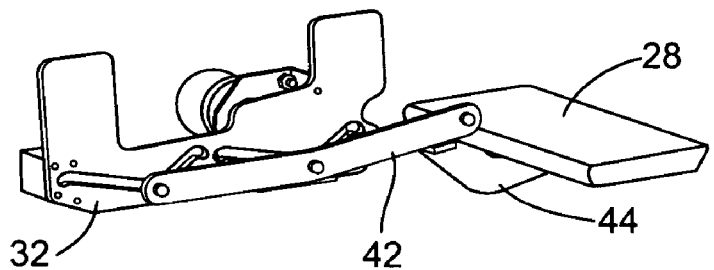
Figure 13F:
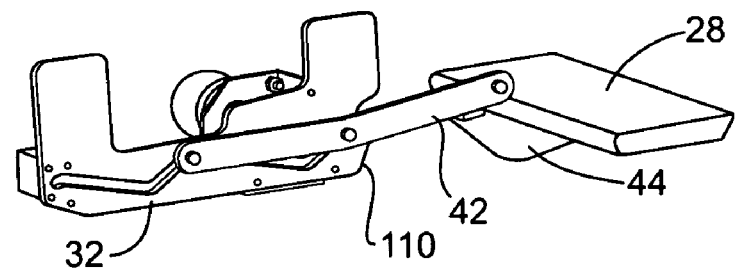

In another embodiment, illustrated schematically in FIGS. 13*a-f*, the function of the biasing link 52 may be replaced by a cam surface 110 along the front of the main rail 32. Aside from the elimination of the biasing link 52, the operation of the step proceeds similarly to the previously described embodiments. FIG. 13*a* shows the step in its fully retracted position. As the motor engages, the step rotates against the cam as illustrated in FIGS. 13*b*-13*d*, while the support link 42 and its respective pins 46, 48 travel along slots 34, 36. As may be seen in FIG. 13*d*, when the step 28 reaches its horizontal position, the portion 96 of the support arm 44 acts as a hard stop against the support link 42, just as in the preceding embodiments. As the pins reach the central positions of the slots 34, 36, the step 28 is in its step assist position, and it remains supported against the support link 42 by the portion 96 of the support arm. Upon further actuation of the motor, the pins reach the respective outer positions of their respective slots 34, 36 and the step is in its roof access position.

As with the previous embodiments, a bias spring (not shown) can be added to bias the step towards its retracted position so that vibration of the step may be reduced during travel.

In each described embodiment, it may be useful to include a relatively soft material on an upper surface of the running board 28. The relatively soft material can be selected to reduce the possibility of the running board scratching the vehicle body when in the retracted position, as vibration of the running board during vehicle motion can cause it to rub against the vehicle body.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A retractable running board assembly for use with a vehicle having a passenger compartment and an opening for permitting a person to enter and exit the passenger compartment, the assembly comprising:
   an anchor constructed and arranged to mount the running board assembly to the vehicle in an operative position beneath the passenger compartment;
   a longitudinally-elongated retractable running board; and
   a running board moving assembly comprising:
      a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation spaced above ground level, and (b) a retracted position wherein the running board is retracted inwardly from the extended position; and
      a selectively-operable driving mechanism operatively connected to the selectively-actuated link such that, when the running board assembly is mounted in the operative position, selective operation of the driving mechanism actuates the selectively-actuated link to move the running board between the step-assist and retracted positions,
   wherein the link comprises:
      a pair of generally horizontally oriented travel slots; and
      a linking structure having structures constructed and arranged to engage the travel slots for guiding the running board between the step-assist and retracted positions as the driving mechanism actuates the selectively-actuated link.

2. A retractable running board assembly according to claim 1, wherein the selectively-actuated link further comprises:
   a generally horizontally oriented rotating slot; and
   the linking structure further comprises a structure constructed and arranged to engage the rotating slot such that as the driving mechanism actuates the selectively-actuated link, the link member causes the running board to rotate from an inwardly rotated attitude when in the retracted position into an outwardly rotated attitude when in the step-assist position.

3. A running board assembly according to claim 2, wherein the rotating slot has at least one section having a length and/or path different from a corresponding section of the travel slots such that at least a portion of the link member applies a rotational force to the running board during motion from the retracted position.

4. A running board assembly according to claim 2, wherein at least one of the travel slots and/or the rotating slot include at least one detent configured to stabilize the running board in at least one position selected from the group consisting of at least one of the step-assist position or the retracted position.

5. A running board assembly according to claim 2, wherein the running board further is moveable into a roof-access position wherein the running board is positioned outward and upward relative to the step-assist position and the rotating slot has a portion having a length and path equal to a length and path of a corresponding portion of the travel slots such that substantially no relative rotational motion of the step is induced during a movement between the step-assist position and the roof-access position.

6. A running board assembly according to claim 1, further comprising a bias spring constructed and arranged to exert a force on the running board inward when the running board is in the retracted position.

7. A running board assembly according to claim 1, wherein the selectively-actuated driving mechanism includes a motor.

8. A running board assembly according to claim 7, wherein the motor comprises a rotatable motor that is constructed and arranged to drive a worm gear acting in conjunction with a lead screw to provide a linear force, thereby actuating the selectively-actuated link.

9. A running board assembly according to claim 7, wherein the motor is arranged to provide a linear force for actuating the selectively-actuated link.

10. A running board assembly according to claim 1, wherein the selectively-actuated link end portion comprises a portion constructed and arranged to engage another component of the running board assembly such that it acts as a stop, thereby preventing rotational motion of the running board in one direction, when the running board is in the step-assist position.

11. A running board assembly according to claim 1, further comprising:
a plurality of support linkage assemblies, each support linkage assembly including a link constructed and arranged to allow for travel of the links corresponding with the actuation of the selectively-actuated link.

12. A running board assembly according to claim 1, further comprising a material disposed on at least a part of a surface of the running board such that when the running board is in the retracted position, the material is interposed between the running board and a body component of the vehicle.

13. A running board assembly according to claim 12, wherein the material is soft relative to a surface finish of the vehicle.

14. A running board assembly according to claim 1, wherein the selectively-actuated link further comprises:
a cam surface, wherein the linking structure comprises structure constructed and arranged to engage the cam surface, such that as the driving mechanism actuates the selectively-actuated link, the linking structure causes the running board to rotate from an inwardly rotated attitude when in the retracted position into an outwardly rotated attitude when in the step-assist position.

15. A running board assembly according to claim 14, wherein the cam surface comprises an outward surface of a support in which the travel slots are disposed.

16. A running board assembly according to claim 14, wherein the cam surface comprises an inward surface of a support arm of the running board.

17. A running board assembly according to claim 1, wherein the anchor is constructed and arranged to engage a frame component of the vehicle and wherein the vehicle is of unibody construction.

18. A running board assembly according to claim 1, wherein the elevation of the running board when in the step-assist position is lower than the opening of the passenger compartment.

19. A running board assembly according to claim 18, wherein the travel slots include an angled travel portion that extends downward from an inner position corresponding to the retracted position of the running board to an outer position corresponding to the step-assist position of the running board.

20. A running board assembly according to claim 1, wherein the running board, when in the retracted position is raised upwardly from the extended position.

21. A retractable running board assembly for use with a vehicle having a passenger compartment and an opening for permitting a person to enter and exit the passenger compartment, the assembly comprising:
an anchor constructed and arranged to mount the running board assembly to the vehicle in an operative position beneath the passenger compartment;
a longitudinally-elongated retractable running board; and
a running board moving assembly comprising:
a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation spaced above ground level with a step surface of the running board oriented horizontally, and (b) a retracted position wherein the running board is retracted laterally inwardly from the extended position and rotated to face the step surface inwardly with respect to the vehicle; and
a selectively-operable driving mechanism operatively connected to the selectively-actuated link such that, when the running board assembly is mounted in the operative position, selective operation of the driving mechanism actuates the selectively-actuated links to move and rotate the running board between the step-assist and retracted positions such that the movement of the running board between the step-assist and the retracted positions is a compound movement including both the lateral inward retraction and the rotation of the step surface of the running board.

22. A running board assembly according to claim 21, wherein the elevation of the running board when in the step-assist position is lower than the opening of the passenger compartment.

23. A running board assembly according to claim 21, wherein the running board, when in the retracted position is raised upwardly from the extended position.

24. A running board assembly according to claim 21, wherein, when in the retracted position, an outer surface of the running board is constructed and arranged to match a contour of the outer body surface of the vehicle.

25. A running board assembly according to claim 21, wherein the selectively-actuated link further comprises:
a cam surface, wherein the linking structure comprises structure constructed and arranged to engage the cam surface, such that as the driving mechanism actuates the selectively-actuated link, the linking structure causes the running board to rotate from an inwardly rotated attitude when in the retracted position into an outwardly rotated attitude when in the step-assist position.

26. A running board assembly according to claim 21, wherein the running board further is moveable into a roof-access position wherein the running board is positioned outward and upward relative to the step-assist position.

27. A retractable running board assembly for use with a vehicle having a passenger compartment and an opening for permitting a person to enter and exit the passenger compartment, the assembly comprising:
an anchor constructed and arranged to mount the running board assembly to the vehicle in an operative position beneath the passenger compartment;
a longitudinally-elongated retractable running board; and
a running board moving assembly comprising:
a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation spaced above ground level with a step surface of the running board oriented horizontally, and (b) a retracted position wherein the running board is retracted inwardly from the extended position and the step surface is rotated to face inwardly with respect to the vehicle; and a selectively-operable driving mechanism operatively connected to the selectively-actuated link such that, when the running board assembly is mounted in the operative position, selective operation of the driving mechanism actuates the selectively-actuated links to move and rotate the running board between the step-assist and retracted positions;

wherein the selectively actuated link includes an angled travel portion that extends downward from an inner position corresponding to the retracted position of the running board to an outer position corresponding to the step-assist position of the running board.

28. A retractable running board assembly for use with a vehicle having a passenger compartment and an opening for permitting a person to enter and exit the passenger compartment, the assembly comprising:

an anchor constructed and arranged to mount the running board assembly to the vehicle in an operative position beneath the passenger compartment;

a longitudinally-elongated retractable running board; and a running board moving assembly comprising:

a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation spaced above ground level with a step surface of the running board oriented horizontally, and (b) a retracted position wherein the running board is retracted inwardly from the extended position and the step surface is rotated to face inwardly with respect to the vehicle; and a selectively-operable driving mechanism operatively connected to the selectively-actuated link such that, when the running board assembly is mounted in the operative position, selective operation of the driving mechanism actuates the selectively-actuated links to move and rotate the running board between the step-assist and retracted positions;

wherein the running board further is moveable into a roof-access position wherein the running board is positioned outward and upward relative to the step-assist position.

29. A retractable running board assembly for use with a vehicle having a passenger compartment and an opening for permitting a person to enter and exit the passenger compartment, the assembly comprising:

an anchor constructed and arranged to mount the running board assembly to the vehicle in an operative position beneath the passenger compartment;

a longitudinally-elongated retractable running board; and a running board moving assembly comprising:

a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation spaced above ground level with a step surface of the running board oriented horizontally, and (b) a retracted position wherein the running board is retracted inwardly from the extended position and the step surface is rotated to face inwardly with respect to the vehicle; and a selectively-operable driving mechanism operatively connected to the selectively-actuated link such that, when the running board assembly is mounted in the operative position, selective operation of the driving mechanism actuates the selectively-actuated links to move and rotate the running board between the step-assist and retracted positions;

wherein the link comprises:

a pair of a pair of generally horizontally oriented travel slots; and a linking structure having structures constructed and arranged to engage the travel slots such that as the driving mechanism actuates the selectively-actuated link, the link member causes the running board to move between the step-assist and retracted positions.

30. A retractable running board assembly for use with a vehicle having a passenger compartment and an opening for permitting a person to enter and exit the passenger compartment, the assembly comprising:

an anchor constructed and arranged to mount the running board assembly to the vehicle in an operative position beneath the passenger compartment;

a longitudinally-elongated retractable running board; and a running board moving assembly comprising:

a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation spaced above ground level with a step surface of the running board oriented horizontally, and (b) a retracted position wherein the running board is retracted inwardly from the extended position and the step surface is rotated to face inwardly with respect to the vehicle; and a selectively-operable driving mechanism operatively connected to the selectively-actuated link such that, when the running board assembly is mounted in the operative position, selective operation of the driving mechanism actuates the selectively-actuated links to move and rotate the running board between the step-assist and retracted positions;

wherein the link further comprises:

a generally horizontally oriented rotating slot; and the linking structure further comprises a structure constructed and arranged to engage the rotating slot such that as the driving mechanism actuates the selectively-actuated link, the link member causes the running board to rotate from an inwardly rotated attitude when in the retracted position into an outwardly rotated attitude when in the step-assist position.

31. A retractable running board assembly for use with a vehicle having a passenger compartment and an opening for permitting a person to enter and exit the passenger compartment, the assembly comprising:
  an anchor constructed and arranged to mount the running board assembly to the vehicle in an operative position beneath the passenger compartment;
  a longitudinally-elongated retractable running board; and
  a running board moving assembly comprising:
    a selectively-actuated link having an end portion connected to the running board and an opposite end portion connected to the anchor, the link being constructed and arranged such that, when the running board assembly is mounted in the operative position, actuation of the selectively-actuated link moves the running board between (a) a step-assist position wherein the running board extends outwardly from the vehicle away from the opening at an elevation lower than the opening of the passenger compartment and spaced above ground level, (b) a roof-access position wherein the running board is positioned outward and upward relative to the step-assist position, and (c) a retracted position wherein the running board is retracted inwardly, rotated inwardly and raised upwardly from the extended position, and
    a selectively-operable driving mechanism operatively connected to the selectively-actuated link such that, when the running board assembly is mounted in the operative position, selective operation of the driving mechanism actuates the selectively-actuated links to move the running board between the step-assist, roof-access and retracted positions,
  wherein the link comprises:
    a pair of generally horizontally oriented travel slots; and
    a linking structure having structures constructed and arranged to engage the travel slots such that as the driving mechanism actuates the selectively-actuated link, the link member causes the running board to move between the step-assist, roof-access and retracted positions.

* * * * *